US008462797B2

(12) United States Patent
Cilli et al.

(10) Patent No.: US 8,462,797 B2
(45) Date of Patent: Jun. 11, 2013

(54) METHOD OF PRIORITY BASED TRANSMISSION OF WIRELESS VIDEO

(75) Inventors: Bruce R. Cilli, Atlantic Highlands, NJ (US); Charles Payette, Oceanport, NJ (US)

(73) Assignee: Alcatel Lucent, Paris (FR)

( * ) Notice: Subject to any disclaimer, the term of this patent is extended or adjusted under 35 U.S.C. 154(b) by 379 days.

(21) Appl. No.: 12/793,213

(22) Filed: Jun. 3, 2010

(65) Prior Publication Data

US 2011/0128923 A1 Jun. 2, 2011

Related U.S. Application Data

(60) Provisional application No. 61/265,111, filed on Nov. 30, 2009, provisional application No. 61/265,121, filed on Nov. 30, 2009.

(51) Int. Cl.
*H04L 12/28* (2006.01)

(52) U.S. Cl.
USPC ............. 370/395.64; 370/310.2; 370/328; 370/395.21; 455/422.1; 455/452.2; 455/512

(58) Field of Classification Search
USPC .......... 370/310.2, 328–339, 349, 395.21, 370/395.64; 455/422.1, 452.2, 512
See application file for complete search history.

(56) References Cited

U.S. PATENT DOCUMENTS

| 6,510,177 | B1 | 1/2003 | De Bonet et al. | |
| 2002/0021761 | A1 | 2/2002 | Zhang et al. | |
| 2002/0116473 | A1 | 8/2002 | Gemmell | |
| 2004/0114576 | A1* | 6/2004 | Itoh et al. | 370/352 |
| 2005/0220069 | A1* | 10/2005 | Li et al. | 370/349 |
| 2005/0220190 | A1* | 10/2005 | Ha et al. | 375/240.16 |
| 2006/0149845 | A1* | 7/2006 | Malin et al. | 709/228 |
| 2006/0176808 | A1* | 8/2006 | Isobe et al. | 370/229 |
| 2007/0009039 | A1 | 1/2007 | Ryu | |
| 2007/0013561 | A1 | 1/2007 | Xu et al. | |
| 2008/0068446 | A1 | 3/2008 | Barkley et al. | |
| 2008/0069242 | A1 | 3/2008 | Xu et al. | |
| 2009/0006927 | A1* | 1/2009 | Sayadi et al. | 714/762 |
| 2009/0034629 | A1* | 2/2009 | Suh et al. | 375/240.27 |
| 2009/0187960 | A1* | 7/2009 | Lee et al. | 725/131 |
| 2011/0129011 | A1* | 6/2011 | Cilli et al. | 375/240.01 |

FOREIGN PATENT DOCUMENTS

| EP | 1 742 476 A1 | 1/2007 |
| WO | 03/036911 A2 | 5/2003 |
| WO | PCT/US2010/055782 | 2/2011 |

OTHER PUBLICATIONS

Blake et al., RFC 2475—An Architecture for Differentiated Services, Dec. 1998, IETF, 36 pages.*

(Continued)

*Primary Examiner* — Hoon J Chung
(74) *Attorney, Agent, or Firm* — Wall & Tong, LLP

(57) ABSTRACT

A method and apparatus are provided for transmitting, over a wireless link, video that is coded in multiple layers such that higher priority for the use of the transmission resources may be given to the lower layers of the layered video stream. The level of priority is signified by the session identification parameters, i.e., by the source and destination ip addresses and port numbers. These parameters are assigned to the base layer and to the one or more additional layers, respectively, such that at least two of said layers are assigned different parameter sets. At least the base layer is then transmitted on the wireless link.

23 Claims, 3 Drawing Sheets

OTHER PUBLICATIONS

S.Wenger, (Independent) Y.K. Wang,(Huawei Technologies) T. Schierl, (Fraunhofer HHI) A. Eleftheriadis, (Vidyo)—RTP Payload Format for SVC Video draft-ietf-avt-rt[-svc-21.txt—Apr. 26, 2010—105 pages.

T. Schierl, Fraunhofer HHI, S. Wenger—Signalling Media Decoding Dependency in the Session Description Protocol (SDP)—Jul. 2009—pp. 19.

Fraunhofer Gesellschaft et al: "Pseudo CR for section 7 on Graceful Degradation Use Case", 3GPP Draft; S4-090587, 3rd Generation Partnership Project (3GPP), Mobile Competence Centre; 650, Route Des Lucioles; F-06921 Sophia-Antipolis Cedex; France, No. Kista; 20090812, Aug. 12, 2009, XP050356874, [retrieved on Aug. 12, 2009] sections 7.2.x.1-7.2.x.4 figures 1-11.

Kofler I et al: "Improving IPTV services by H.264/SVC adaptation and traffic control", Broadband Multimedia Systems and Broadcasting, 2009. BMSB '09. IEEE International Symposium on, IEEE, Piscataway, NJ, USA, May 13, 2009, pp. 1-6, XP031480123, ISBN: 978-1-4244-2590-7.

Hoffman D et al: "Hierarchical video distribution over Internet-style networks", Proceedings of the International Conference on Image Processing (ICIP) Lausanne, Sep. 16-19, 1996; [Proceedings of the International Conference on Image Processing (ICIP)], New York, IEEE, US, vol. 1, Sep. 16, 1996, pp. 5-8, XP010202065, DOI: DOI:10.1109/ICIP.1996.559418 ISBN: 978-0-7803-3259-1 section 2.

Alcatel-Lucent: "Handling of GBR traffic with MBR greater than GBR", 3GPP Draft; S2-080331_Discussion on Handling of GBR Traffic, 3rd Generation Partnership Project (3GPP), Mobile Competence Centre; 650, Route Des Lucioles; F-06921 Sophia-Antipolis Cedex, France, vol. SA WG2, No. Marina del Rey; 20080109, Jan. 9, 2008, XP050262832, [retrieved on Jan. 9, 2008] section 1.4.

Schulzrinne Columbia University S Casner Packet Design R Frederick Blue Coat Systems Inc V Jacobson Packet Design H: "RTP: A Transport Protocol for Real-Time Applications; rfc3550. txt", IETF Standard, Internet Engineering Task Force, IETF, CH, Jul. 1, 2003, XP015009332, ISSN: 0000-0003.

Cricri F et al: "Mobile and Interactive Social Television a A virtual TV room", World of Wireless, Mobile and Multimedia Networks &Workshops, 2009. WOWMOM 2009. IEEE International Symposium on A, IEEE, Piscataway, NJ, USA, Jun. 15, 2009, pp. 1-8, XP031543595, ISBN: 978-1-4244-4440-3.

* cited by examiner

METHOD OF PRIORITY BASED TRANSMISSION OF WIRELESS VIDEO

CROSS-REFERENCE TO RELATED APPLICATIONS

This application is related to pending patent application Ser. No. 12/702,722, entitled "Individual and Institution Virtualization Mechanisms," filed Feb. 9, 2010, and application Ser. No. 13/733,236, filed Dec. 31, 2012 entitled "Method and System for Adaptive Video Transmission" and application Ser. No. 12/938,486, entitled "Method of Opportunity-Based Transmission of Wireless Video, filed Nov. 3, 2010.

The subject matter of this application is related to the subject matter of the commonly owned U.S. patent application Ser. No. 12/702,722, filed Feb. 9, 2010, entitled "SYSTEM AND METHOD OF WIRELESS UPLINK VIDEO TRANSMISSION".

The subject matter of this application is related to the subject matter of the commonly owned U.S. Provisional Application No. 61/265,121, filed Nov. 30, 2009, entitled "METHOD OF OPPORTUNITY-BASED TRANSMISSION OF WIRELESS VIDEO."

FIELD OF THE INVENTION

The invention relates to wireless communication networks, and more particularly to video transmission over the air interface in such networks.

ART BACKGROUND

Wireless access links such as those provided by 3G and 4G networks are shared, limited resources. As such, they may become scarce as demand outstrips supply. As a consequence, contention will arise when too many users attempt to transmit data from their mobile devices within the same sector. Until recently, users predominantly uploaded considerably less data than they would download. However, the recent introduction of video-enabled mobile devices is likely to stimulate rapidly growing demand for uplink bandwidth.

For this and other reasons, there is a growing need for flexible methods of video transmission that can provide enough quality to satisfy user needs while consuming relatively little bandwidth during times when resources are scarce, and that can provide higher quality when resources are more plentiful.

SUMMARY OF THE INVENTION

The H.264 Scalable Video Codec (SVC) provides a mechanism to encode video in multiple layers, including a base layer and one or more additional layers. Transmitting the base layer is sufficient to allow the receiver to decode a viewable video signal, but each additional layer adds to the quality of the decoded signal. For example, the different layers may represent video that has been coded at different levels of quality in such a way that data and decoded samples of lower qualities can be used in conjunction with data from the upper layers to create a higher quality video.

We have provided a new method and apparatus to transmit video that is coded in multiple layers, as described above. For transmission, higher priority for the use of the transmission resources is given to the lower layers of the layered video stream. We have provided H.264 SVC as one example of a video coding mechanism that is useful in this regard. However, our new method is not limited to H.264 SVC, but will apply to any video coding mechanism that separates the video into multiple streams.

Accordingly, one embodiment is a method that includes coding a video signal as a base layer and at least one additional layer, in which the base layer is sufficient for recovery of viewable video content and one or more of the additional layers add quality to the recovered video content. The method further comprises assigning session identification parameters to the base layer and to the one or more additional layers, respectively, such that at least two of said layers are assigned different sets of session identification parameters, and transmitting at least the base layer on a wireless access link. The session identification parameters are the source and destination ip addresses and port numbers.

In other embodiments, a method performed at a base station includes setting up a session with a wireless user terminal, allocating radio resources for the session, and receiving or transmitting at least some of the packets belonging to the session, i.e., receiving them from the user terminal or transmitting them to the user terminal. According to such methods, the packets belonging to the session constitute two or more coded video streams having different respective sets of session identification parameters, the allocation of radio resources is carried out so as to favor at least one set of session identification parameters over at least one other set of session identification parameters, the two or more coded video streams correspond to a video signal coded as a base layer and at least one additional layer, the base layer is sufficient for recovery of viewable video content, and at least one of the additional layers adds quality to the recovered video content.

In another embodiment, a terminal apparatus includes a video camera, a video coder operative to encode a video signal from the video camera as a base layer sufficient for recovery of viewable video content and one or more additional layers effective to add quality to the recovered video content, a processor circuit, and a transmitter. The processor circuit includes one or more digital processors and is operative to package each coded video layer as a stream of packets having a respective set of session identification parameters. One or more of the processors is configured to assign the session identification parameters such that at least two of the coded video layers are assigned different parameter sets. The transmitter is operative to transmit the packet streams over a wireless link.

DETAILED DESCRIPTION

Figure 1:
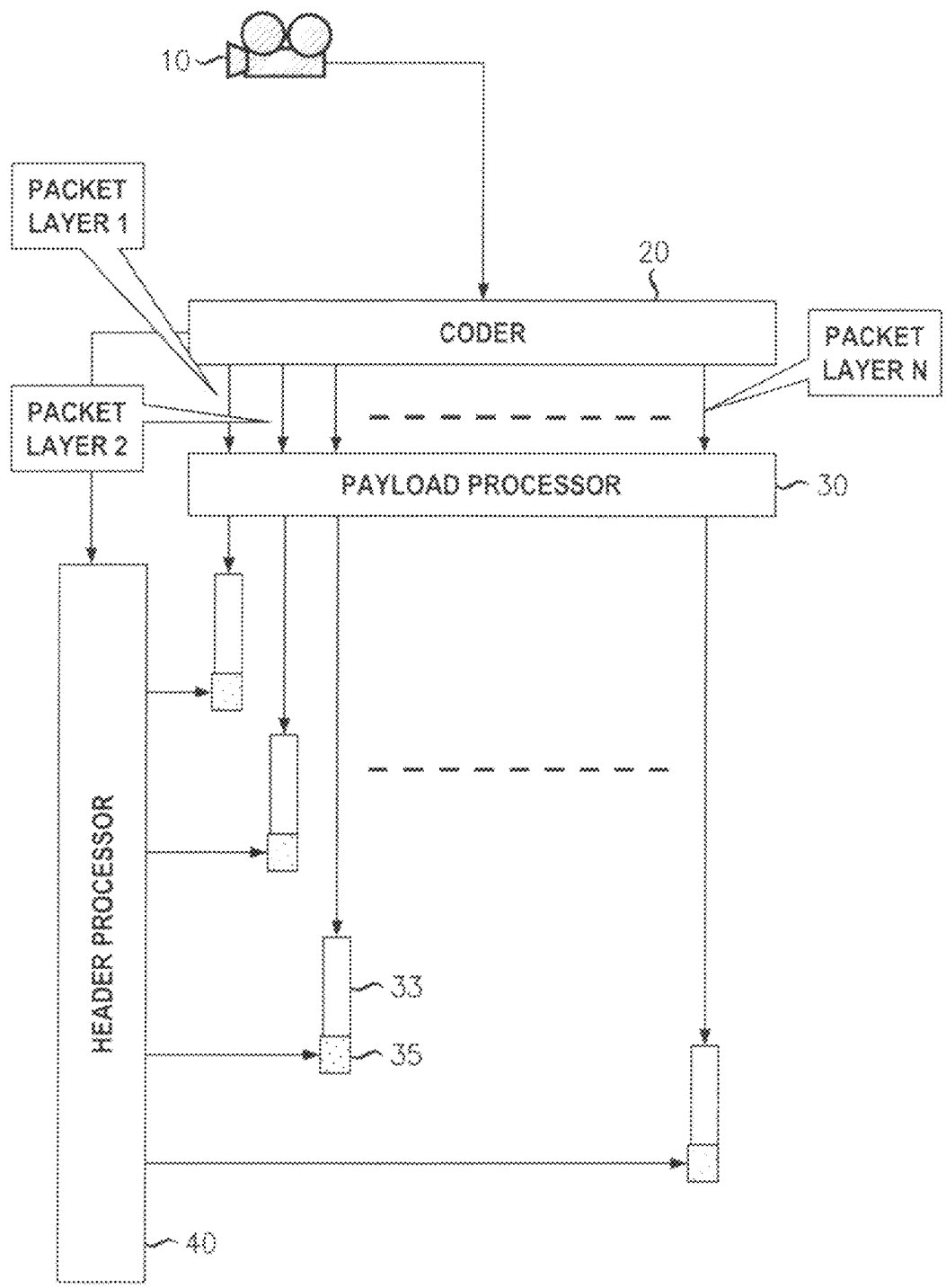
FIG. 1 is a conceptual block diagram of a mobile phone or other user terminal useful for practicing the invention in at least some embodiments.

Conventional methods of over-the-air transmission do not provide a mechanism for giving different priorities to different layers of the video stream. Thus, it is typical for all layers to compete equally for transmission resources. One consequence is that the multiple layer coding provided by, e.g., the H.264 SVC does not facilitate the kind of flexible use of transmission bandwidth for video that is described above.

Transmitting all layers with equal priority is also disadvantageous because, as explained above, the coding is such that information in the base layer is needed for the rendering of the higher-quality video with input from the higher layers. Therefore, packet loss from the base layer is much more damaging to the video reconstruction than packet loss from any of the upper layers.

It would be possible, of course, for the original sender to transmit only one layer, or to transmit several but fewer than all layers. This would reduce bandwidth, but only at the expense of reducing the video quality even during times when available bandwidth is plentiful.

In principle, it would be possible to distinguish packets belonging to different layers by using a router that is enabled to perform deep packet inspection. Such a router could look at the packets in each layer and award priority to packets belonging to the lower layers. This would help to ensure that the lower layer packets are delivered before the higher layer packets.

However, wireless standards for over-the-air transmission generally lack the mechanism to perform deep packet inspection. Therefore, each layer would simply be assigned the same priority, with the result that loss of a more important lower layer packet would be as probable as loss of a higher layer packet during times of congestion on the over-the-air link.

Thus, there is a need for a method of ingress into the classification scheme that is practicable in wireless networks. By "classification" in this regard, we mean the process for identifying which layer a packet belongs to, and for affording different treatments to packets identified with different layers. Thus, for example, a server having ingress to a classification scheme might examine the header or other content of a packet and determine on that basis what quality of service to provide to the corresponding flow.

In fact, proposals have been made, such as the draft RFC obtainable from the World Wide Web at http://tools.ietf.org/pdf/draft-ietf-avt-rtp-svc-21.pdf for methods of video transmission across multiple streams using the RTP payload format to provide the ingress into the classification scheme. Such methods are of interest at least for fixed IP networks. However, such a use of the RTP payload format is less common in wireless networks.

That is, the classification criteria for the over-the-air interface are generally based on some combination of the following five parameters: The source and destination ip addresses, the source and destination port numbers, and the connection type, which is an index identifying the protocol to which a particular stream of packets belongs. Those five parameters taken together are referred to here as a 5-tuple, and such a classification scheme is referred to here as 5-tuple classification. We refer to the source and destination ip addresses and port numbers as the four session identification parameters.

Those wireless standards that pertain to air interfaces as described above will generally lack support for classification schemes using the RTP payload format.

As mentioned above, our goal is to provide higher priority to the lower layers of the layered video stream. In order to achieve this, we take advantage of the fact that most wireless standards permit packets to be assigned different priorities which are distinguished using the above-described 5-tuple classification.

Accordingly, we provide a different set of session identification parameters for each layer of video. For example, we could use a different source port, a different destination port, or both, for each layer. Alternatively, we could use a different source ip address, a different destination ip address, or both, for each layer. Those skilled in the art will recognize additional ways to distinguish the parameter set for one layer from that for another layer by changing one or more of the session identification parameters.

In typical wireless 3G and 4G wireless networks, the base station is responsible for allocating the radio resources on the uplink or downlink that supports, respectively, the wireless transport of packets from the originating user terminal or to the destination user terminal. Radio resources are any allocable radio signal properties that affect the data transmission rate, including, for example, bandwidth, power, timeslots, codes; and frequency subchannels.

Thus, 5-tuples containing different pairs of port numbers, for example, can be used to indicate to the pertinent network entity that each respective flow must be treated with a different priority. The network entity that is pertinent in this regard is that entity which governs admission control and flow setup. In the example scenarios we present below, we assume that this entity resides in the base station. However, such entity may in fact reside at network nodes distinct from the base station. In LTE networks, for example, the pertinent network entity is the Mobility Management Entity (MME).

The base station receives the 5-tuples as part of the sequence of signaling messages that are exchanged in order to set up a session with the user terminal. Based on these messages, flows are established. Using its scheduling function, the base station (possibly with the help of a control node such as the MME) then allocates uplink or downlink radio resources so as to provide the requested QoS or other priority treatment to each flow that is queued at the user terminal for uplink transmission to the base station, or queued at the base station for downlink transmission to the user terminal. At the destination user terminal, the flows are merged and the resulting video is reconstructed.

In LTE networks, for example, a parameter referred to as the QoS Class Identifier (QCI) can be used to refer to preconfigured node-specific parameters controlling the forwarding of packets. Controlled features may include scheduling weights, admission thresholds, queue management thresholds, link-layer protocol configurations, and the like. In such a network, the base station may assign different QCIs to different packet flows, based on the priority information that the base station infers from the 5-tuple parameters.

In some cases, it may be desirable for the packets corresponding to a higher video layer to be transported to the destination user terminal at a significant delay after the delivery of the lower-layer packets. In such a case, it will be desirable to identify the later-delivered packets as belonging to the same video stream, so that the destination user terminal can use them to render a version of the video content having higher quality than that originally delivered. Various methods of identification are possible. One such method is described in RFC 5583, "Signaling Media Decoding Dependency in the Session Description Protocol (SDP)," July 2009, http://tools.ietf.org/html/rfc5583. Very briefly, RFC 5583 provides a signaling method by which the nodes in an IP network using the Real-Time Transport Protocol (RTP) can inform each other of the decoding dependencies of media bitstreams that are to be transmitted. (A media bitstream is a valid, decodable stream that conforms to a media coding standard.) In particular, RFC 5583 describes the signaling of such decoding dependencies for layered media bitstreams. It should be noted in this regard that an SDP session description may contain one or more media descriptions. Each media description may identify one media stream. A layered media bitstream includes one or more media partitions, each conveyed in its own media stream.

A media partition is part of a media bitstream which is intended for independent transportation, and which may represent one or more layers that are to be handled as a unit. A decoding dependency is a type of relationship between media partitions. In the case of a layered decoding dependency, each media partition can be decoded only when the media partitions on which it depends are also available.

As will be understood by those skilled in the art, the TCP and UDP protocols may apply if the video streaming is conducted according to the IP suite of protocols. At least in such cases, the port numbers will typically be TCP port numbers or UDP port numbers.

Accordingly, as shown in FIG. 1, a mobile phone or other user terminal includes a video camera 10. The video stream from the camera enters a processor or processors, some of whose various functionalities are indicated in the figure as coder 20, payload processor 30, and header processor 40. This representation is meant to be purely conceptual, and it may have many different practical realizations in hardware and software, none of which are meant to be excluded. In general, however, at least one hardware processing device, such as a digital signal processor, will carry out the illustrated operations or their equivalent under appropriate control, which may be provided, e.g., by a program implemented in hardware, software, or firmware.

Coder 20 processes the video stream according, for example, to the H.264 SVC specification or other multilayer video protocol. This results in multiple outputs, each of which corresponds to one of several coding layers, as described above. The various coding layers are indicated in the figure as Packet Layer 1, Packet Layer 2, etc.

Payload Processor 30 assembles the coded data into packet payloads 33. Header information 35 must be appended to each of the packets. Included in the header information is the 5-tuple that identifies, among other things, the priority of the flow to which each respective packet belongs. This header information is provided by Header Processor 40.

Figure 2:
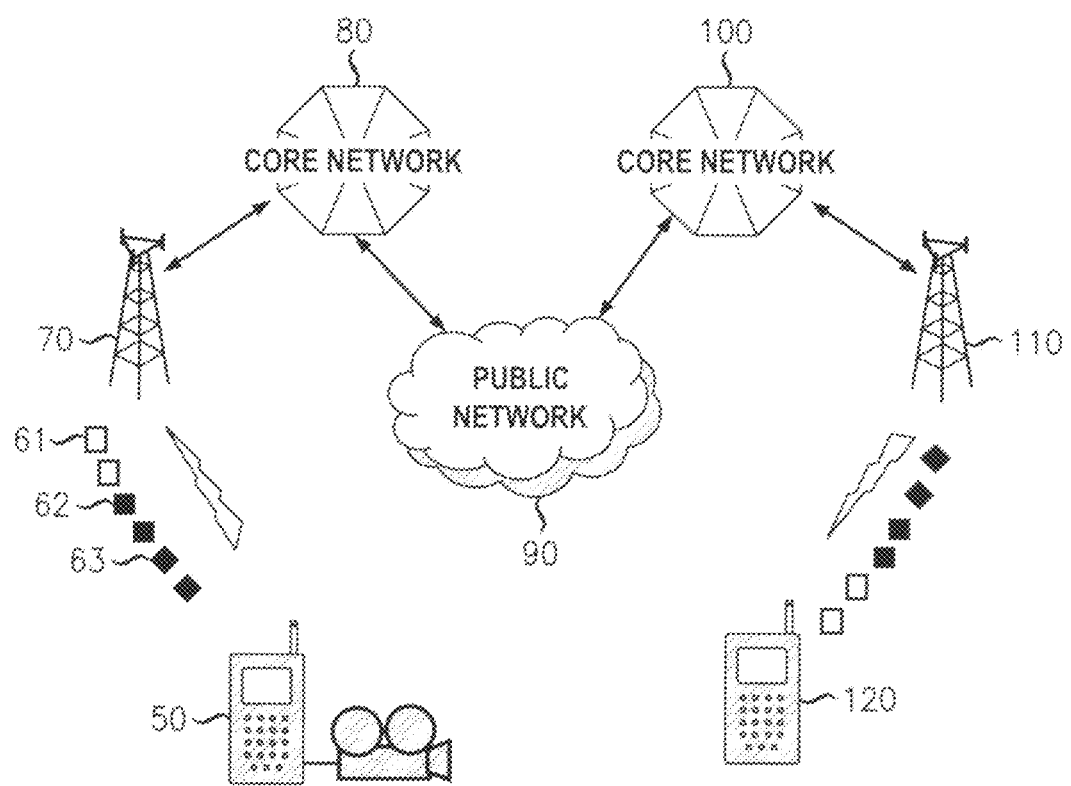
FIG. 2 is a conceptual block diagram of a wireless communication network in which the user terminal of FIG. 1 may be an element.

In an example scenario as illustrated in FIG. 2, a user 50 streams video from his mobile phone, which may for example be a smartphone. The phone includes a video encoder. The video encoder applies H.264 SVC to produce multiple coded layers. A processor in the phone assigns port numbers to the coded packets. In a departure from current practice, the processor would not assign the same port numbers to all the packets, but instead would assign the port numbers in accordance with the layers to which the respective packets belong. Each respective layer may be identified by a particular source or destination port number, or by a particular combination of source and destination port numbers. Those skilled in the art will recognize various techniques, implementable in hardware or software, for making the port-number assignments. It will be appreciated, for example, that software programs are readily provided that can make the port assignment by, among other things, writing the different layers to different sockets.

Packets 61, 62, 63 corresponding to the respective coded layers are transmitted to base station 70. Base station 70 transmits the packets to its core network 80, from which the packets are transmitted toward their destination through public network 90, which may, e.g., be the Internet. The public network delivers the packets to core network 100, which serves the user for whom the packets are destined. Core network 100 transmits the packets to base station 110, which transmits them to destination user 120.

Base station 70, through its scheduler, controls the possible dropping of packets queued for uplink transmission in layers 61, 62, etc. in dependence on the network conditions and on the priority treatment requested for each of the respective layers. Base station 110 similarly controls the possible dropping of packets queued for downlink transmission to user 120 in layers 61, 62, etc. in dependence on the network conditions and on the priority treatment requested for each of the respective layers.

There are known mechanisms in at least some types of networks, including WiMax and LTE networks, for giving different Quality of Service (QoS) to different flows. In the example scenario, the assigned port numbers are the indication to the classifier in the wireless network of what QOS to afford to the flows comprising the respective packets.

The receiver reconstructs the video signal, using the mapping between assigned port numbers and video coding layers. That is, the port numbers tell the receiver which packets belong to the same flow, and they further tell the receiver which layer corresponds to a given flow. The receiver is responsible for recombining these flows for input to the decoder. Ultimately, the decoder determines the structure of the layers based on the coding method, e.g., H.264 SVC.

Figure 3:
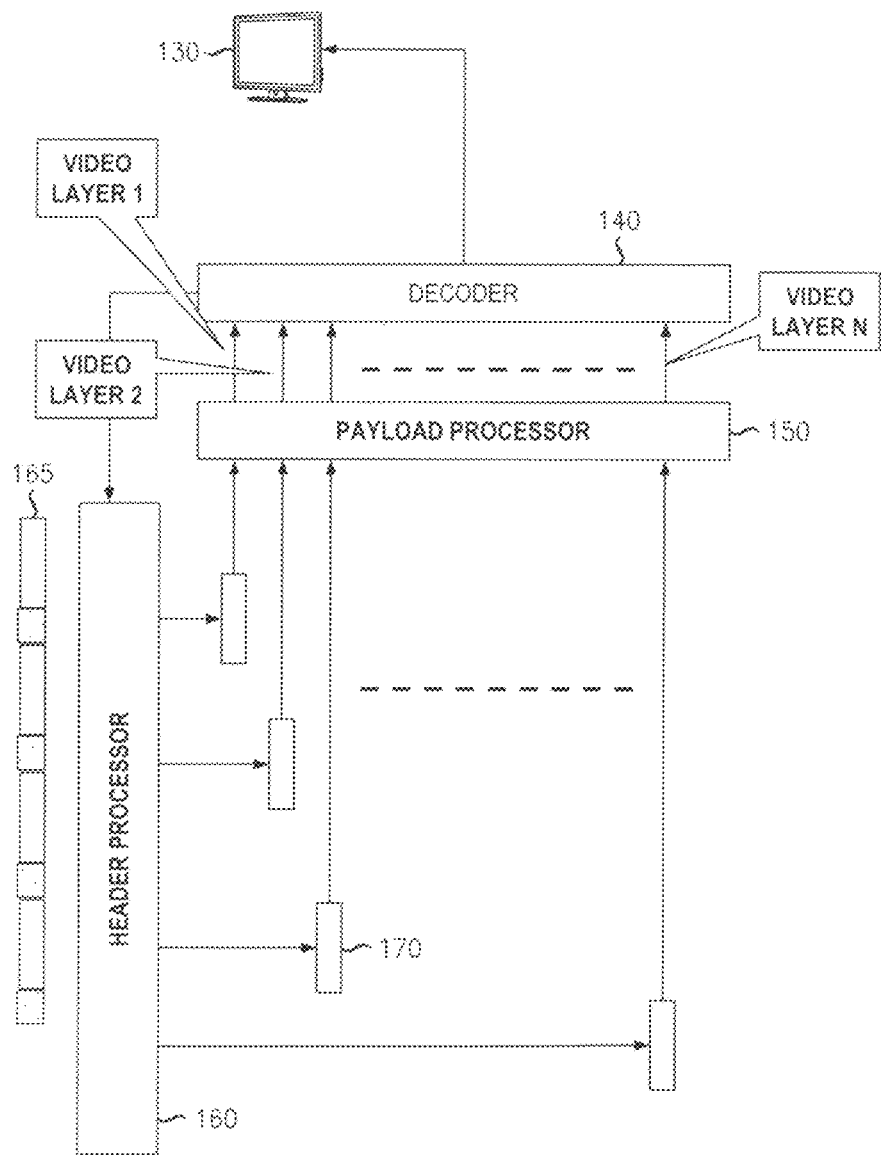
FIG. 3 is a conceptual block diagram of a mobile phone or other user terminal useful for practicing the invention in at least some embodiments. In contrast to FIG. 1, where features useful for the transmission of video are emphasized, FIG. 3 emphasizes features useful for the reception of video. The features of FIGS. 1 and 3 may of course be combined in one device.

Accordingly, as shown in FIG. 3, a mobile phone or other user terminal includes a video display device 130. The video stream to the display device is output from a processor or processors, some of whose various functionalities are indicated in the figure as decoder 140, payload processor 150, and header processor 160. This representation is meant to be purely conceptual, and it may have many different practical realizations in hardware and software, none of which are meant to be excluded. In general, however, at least one hardware processing device, such as a digital signal processor, will carry out the illustrated operations or their equivalent under appropriate control, which may be provided, e.g., by a program implemented in hardware, software, or firmware.

Header processor 160 extracts the header information from the received packets 165, including the 5-tuple that identifies, among other things, the priority of the flow to which each respective packet belongs. Accordingly, the packets are separated according to the respective layers to which they belong.

Payload Processor 150 converts the packet payloads 170 into coded video streams in each respective layer. The various coded layers are indicated in the figure as Video Layer 1, Video Layer 2, etc.

Decoder 140 processes the video streams according, for example, to the H.264 SVC specification or other multilayer video protocol in order to recover the video signal that is provided to display device 130.

The invention claimed is:

1. A method for transmission on a wireless access link, comprising:
    coding a video signal as a base layer and at least one or more additional layer, wherein the base layer is sufficient for recovery of viewable video content and the at least one or more said additional layers add quality to the recovered video content;
    assigning a highest priority to the base layer and respective lower priorities to the at least one or more additional layers; and
    transmitting the highest priority base layer over the at least one or more lower priority layers on the wireless access link; and
    wherein the assigning step comprises assigning a source port number and a destination port number to each of the base layer and the at least one or more additional layers such that at least two of the base layer and the at least one or more additional layers are assigned different source port numbers, different destination port numbers or different source and destination port numbers.

2. The method of claim 1, wherein the transmitting step is performed from a mobile wireless user terminal.

3. The method of claim 1, wherein the coding step is performed using H.264 SVC.

4. The method of claim 1, further comprising associating a different priority with each pair of port numbers consisting of said source port number and said destination port number assigned to a layer.

5. The method of claim 1, further comprising associating a different QoS level with each pair of port numbers consisting of a said source port number and said destination port number assigned to a layer.

6. The method of claim 1, further comprising receiving an allocation of radio resources, and wherein the transmitting step comprises first using at least some of said radio resources for transmitting the base layer, and then using further allocated resources, if enough are remaining, for transmitting the at least one or more of the additional layers.

7. The method of claim 1, wherein the total number of layers to be transmitted is limited by the availability of network resources.

8. The method of claim 1, further comprising assigning a QOS level to the base layer and to each of the at least one or more additional layers, and wherein the transmitting step comprises conditionally transmitting each of the base layer and the at least one or more additional layers depending on the availability of bandwidth for transmissions at its respective QOS level as signified in the received radio resource allocation.

9. A terminal apparatus, comprising:
a video camera;
a video coder configured to encode a video signal from the video camera as a base layer sufficient for recovery of viewable video content and one or more additional layers effective to add quality to the recovered video content;
a processor circuit including one or more digital processors, said circuit configured to package each coded video layer as a stream of packets having a highest priority to a base layer and respective lower priorities to the one or more additional layers, said one or more processors being configured to code the video signal such that the base layer is sufficient for recovery of viewable video content and the one or more additional layers add quality to the recovered video content; and
a transmitter configured to transmit the highest priority base layer over lower priority layers over a wireless link;
wherein the base layer and the one or more additional layers constitute different coded video streams differing at least by having different source port numbers, different destination port numbers or different source and destination port numbers.

10. A method performed at a base station, comprising:
setting up a session with a wireless user terminal;
allocating radio resources for the session; and
receiving at least some packets belonging to the session from the wireless user terminal, wherein:
(a) the at least some packets belonging to the session constitute two or more coded video streams corresponding to a video signal coded as a base layer and at least one or more additional layers, the base layer being assigned a highest priority and respective lower priorities to the at least one or more additional layers;
(b) the allocation of radio resources is carried out so as to favor the highest priority base layer over the at least one or more lower priority layers; and
(c) the base layer is sufficient for recovery of viewable video content and the at least one or more additional layers add quality to the recovered video content;
wherein the base layer and the at least one or more additional layers constitute different coded video streams differing at least by having different source port numbers, different destination port numbers or different source and destination port numbers.

11. The method of claim 10, further comprising associating different priorities with different combinations of source and destination port numbers in the base layer and the at least one or more additional layers that constitute the coded video streams.

12. The method of claim 10, further comprising associating different QoS levels with different combinations of source and destination port numbers in the base layer and the at least one or more additional layers that constitute the coded video streams.

13. The method of claim 10, wherein the receiving step comprises first using at least some of the allocated radio resources for receiving the coded video stream for the base layer, and then using further allocated radio resources, if enough are remaining, for receiving a video stream or streams for the at least one or more additional layers.

14. The method of claim 10, wherein the receiving step comprises preferentially receiving streams for higher priority layers over streams for lower priority layers.

15. The method of claim 10, wherein the total number of layers to be received is limited by the availability of network resources.

16. The method of claim 10, further comprising assigning respective QOS levels to the video stream for the base layer and to the video stream for each of the at least one or more additional layers, and wherein the receiving step comprises conditionally receiving the video stream for each of the base layer and the at least one or more additional layers depending on the availability of bandwidth for transmissions at its respective QOS level as signified in said radio resource allocation step.

17. A method performed at a base station, comprising:
setting up a session with a wireless user terminal;
allocating radio resources for the session; and
transmitting at least some packets belonging to the session to the wireless user terminal, wherein:
(a) the packets belonging to the session constitute two or more coded video streams corresponding to a video signal coded as a base layer and at least one additional layer, the base layer being assigned a highest priority and respective lower priorities to the one or more additional layers;
(b) the allocation of radio resources is carried out so as to favor the highest priority base layer over lower priority layers;
(c) the base layer is sufficient for recovery of viewable video content and at least one said additional layer adds quality to the recovered video content; and
wherein the base layer and the at least one or more additional layers constitute different coded video streams differing at least by having different source port numbers, different destination port numbers or different source and destination port numbers.

18. The method of claim 17, further comprising associating different priorities with different combinations of source and destination port numbers in the base layer and the at least one additional layer that constitute the coded video streams.

19. The method of claim 18, further comprising associating different QoS levels with different combinations of source and destination port numbers in the base layer and the at least one additional layer that constitute the coded video streams.

20. The method of claim 17, wherein the transmitting step comprises first using at least some of the allocated radio resources for transmitting the coded video stream for the base layer, and then using further allocated radio resources, if enough are remaining, for transmitting a video stream or streams for the at least one additional layer.

21. The method of claim 17, wherein the transmitting step comprises preferentially transmitting streams for higher priority layers over streams for lower priority layers.

22. The method of claim 17, wherein the total number of layers to be transmitted is limited by the availability of network resources.

23. The method of claim 17, further comprising assigning respective QOS levels to the video stream for the base layer and to the video stream for each of the at least one additional layer, and wherein the transmitting step comprises conditionally transmitting the video stream for each of the base layer and the at least one additional layer depending on the availability of bandwidth for transmissions at its respective QOS level as signified in said radio resource allocation step.

* * * * *